United States Patent [19]

Skierwiderski

[11] Patent Number: 4,848,027
[45] Date of Patent: Jul. 18, 1989

[54] PADDED TRUNK HOLDING RING POSSESSING TREE STAKES

[76] Inventor: Bernhard Skierwiderski, Waghäuseler Strasse 10, D-1000 Berlin 31, Fed. Rep. of Germany

[21] Appl. No.: 800,616

[22] PCT Filed: Jan. 26, 1985

[86] PCT No.: PCT/DE85/00025
§ 371 Date: Nov. 15, 1985
§ 102(e) Date: Nov. 15, 1985

[87] PCT Pub. No.: WO85/03193
PCT Pub. Date: Aug. 1, 1985

[30] Foreign Application Priority Data

Jan. 26, 1984 [DE] Fed. Rep. of Germany ....... 3402821

[51] Int. Cl.⁴ .............................................. A01G 17/14
[52] U.S. Cl. ........................................ 47/42; 47/43; 47/39; 248/523
[58] Field of Search ................ 47/42, 43, 40.5, 44, 47/45, 46, 47, 405, 39; 248/523, 156, 508

[56] References Cited

U.S. PATENT DOCUMENTS

| 1,246,749 | 11/1917 | Joiner | 248/539 |
| 2,501,255 | 3/1950 | Bell | 47/43 |
| 2,509,284 | 5/1950 | Allen | 248/156 |
| 2,686,029 | 8/1954 | Raymond | 248/539 |
| 2,905,414 | 9/1959 | Zierder | 47/40.5 |
| 3,838,838 | 10/1974 | Seaman, Jr. | 248/539 |

FOREIGN PATENT DOCUMENTS 3437769 4/1986 Fed. Rep. of Germany ......... 47/43

Primary Examiner—Robert A. Hafer
Assistant Examiner—Sam Rimell
Attorney, Agent, or Firm—Collard, Roe & Galgano

[57] ABSTRACT

The invention concerns a trunk holding ring 1. A trunk holding ring 1 of such a kind serves for the support of young trees, which extend through the region 3. The trunk holding ring 1 is made fast by means of adjustable stake holders 21 to tree stakes, not shown.

For the support of the tree, support spokes 2 are provided, the ends of which are adjustable relative to the axis 3a of the ring. Owing to this capacity for adjustment, an adaptation of the support of the young tree to the tree's growth can take place in very simple manner.

10 Claims, 7 Drawing Sheets

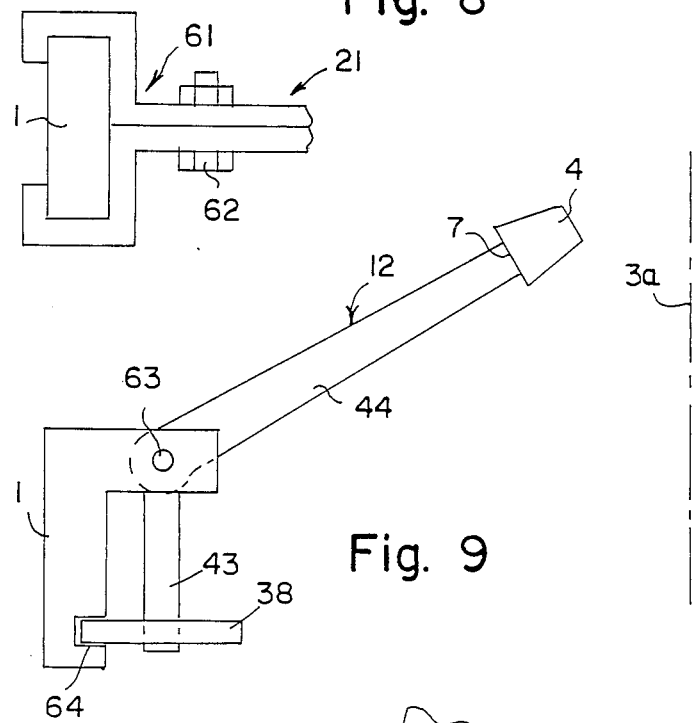
Fig. 8
Fig. 9
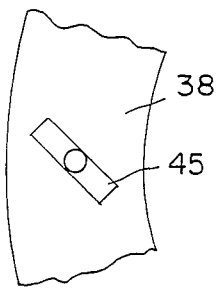
Fig. 10
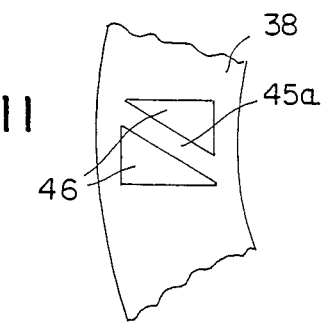
Fig. 11

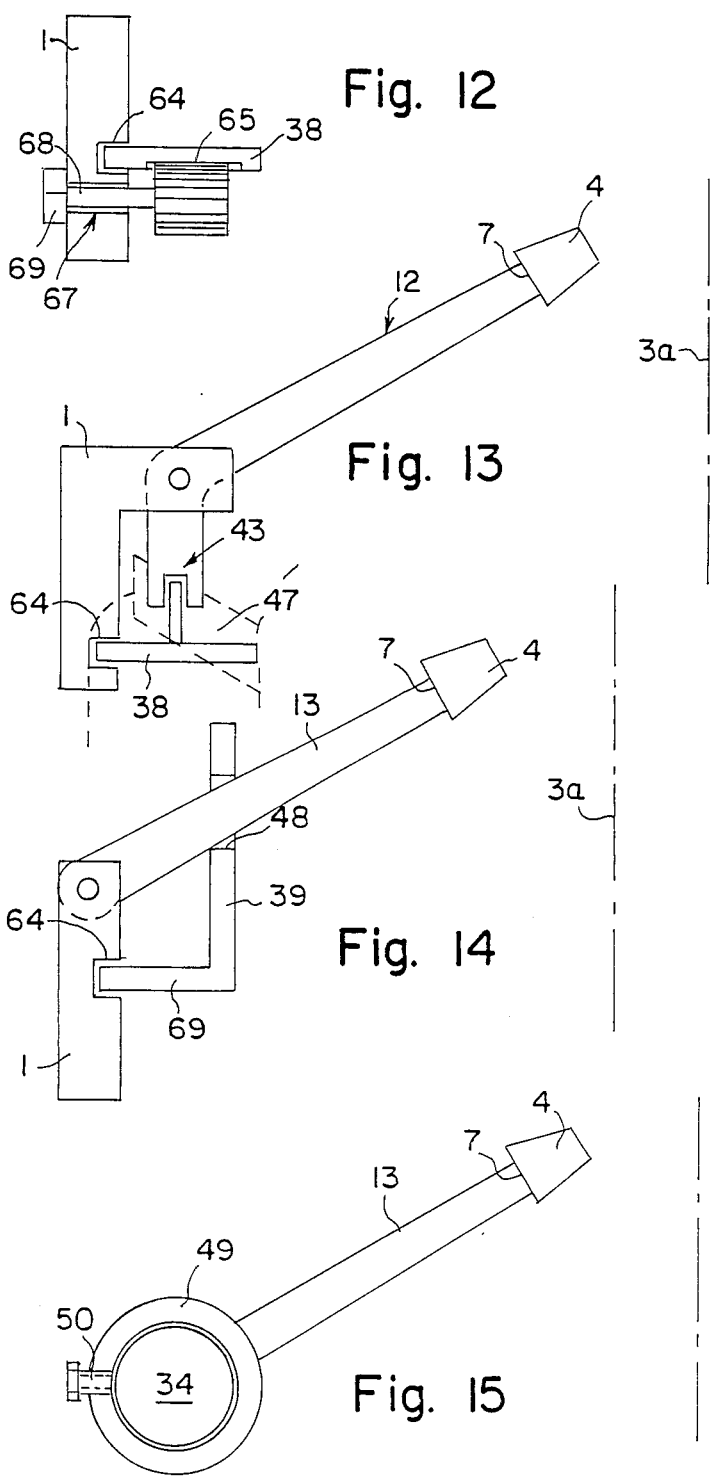

PADDED TRUNK HOLDING RING POSSESSING TREE STAKES

BACKGROUND OF THE INVENTION

The invention relates to a trunk holding ring according to the preamble of the claim 1.

Young, freshly planted trees are supported by means of tree stands during approximately the first ten years of their growth. Tree stands are structural groups which possess tree stakes surrounding the tree, the upper ends of which are connected by means of tree holding rings, which serve at the same time for supporting the tree trunk during the growth.

In order to adapt the tree holding rings to the diameter increase of the growing tree, these are formed as three-part clamps, as the German Utility Model Specifications Nos. 80 25 171 and 82 12 913 describe it. From the known clamp segments stake holders are extended outwards. These are connected by way of stake forks to the tree stakes dug in around about the trees. The clamp segments, padded inside for the protection of the tree, are connected at their ends by tangential screws.

Even the assembly of a tree stand of this type is complicated and time-consuming. The clamp has to be screwed together by means of the tangential screws at the height determined by the tree stakes. At the same time a certain play has to be established between tree trunk and clamp. This demands craft skill. Moreover, the stake holders have to be placed on threaded rods extending radially outwards. The former are then pressed against the tree stakes and fastened to them by means of lock nuts. A compensation of a naturally occurring eccentric position of the tree relative to these tree stands, generally present, is, if not impossible, uncommonly difficult.

For adapting the clamp diameter to the increasing thickness of the growing tree, the clamp circumference has to be enlarged by twisting the tangential screws on the clamp segments. This is complicated because at the same time the clamp segments have to be rearranged symmetrically and centred to the tree, for the proper support of it. For this, experience and craft skill are demanded. In principle, an alternation of the clamp's circumference has to be undertaken at certain intervals of time.

Owing to such an increase of circumference, the distance between the clamp and the stationary tree stakes is also shortened. In this way, the adjustment of the individual clamp segments is made more difficult due to the reactive forces arising. These momentary loosening or damaging forces are transmitted to the ends of the tree stakes. The procedure with these clamps cannot be left to inexperienced trainee personnel.

In the transportation of older trees of considerable size with a weight of up to 6 tonnes, these are transported by means of a gripping apparatus, as the German Auslegeschrift DE-AS No. 11 75 933 describes. With this gripping apparatus, these older and heavier trees are lifted out of the soil together with the dug out root balls. The transportation to the new planting location takes place in this gripping apparatus.

This known gripping apparatus possesses two concentric, cylindrical pairs of half hoops. The inner pair is rotatably mounted in the outer. Both pairs of half hoops are placed around the tree to be lifted out, and then closed. The inner pair of half hoops carries a spindle with pressure disc. By means of this spindle, the pressure disc is so actuated that a tree trunk is firmly clamped in, between this (disc) and the inner wall of a hoop. The clamping in must be so firm that at least half the lifting forces arising in connection with the lifting out of the heavy tree can be transmitted to this clamping point.

The known hoops are not formed as circular, but are cylinder sections. An apparatus of this type, exerting great clamping forces on a tree trunk, is totally unsuitable for a support of a young, growing tree, to be carried out with play. This known clamping technique cannot suggest any solutions of the problems which arise in connection with the supporting of young growing trees.

SUMMARY OF THE INVENTION

Underlying the invention is the problem of providing a trunk holding ring with which the tree stand can easily and in simple fashion be mounted in correct position relative to the tree and without difficulty be adapted to the tree's growth as often as desired.

This problem is solved by means of the technical theory of the claim 1.

The trunk holding ring according to the invention can consist of a combination put forward according to preference of straight and/or curved sections.

Through the use of support spokes, whose ends surround the tree, with play, it is possible to use a trunk holding ring whose diameter does not have to be altered during the entire growth of the tree. As the ends of the support spokes are movable towards and away from the ring axis and can be fixed in a desired setting, it is only required, at the time of the original mounting of the tree stand, to adjust these ends to the desired play by a corresponding movement of the support spokes. The ends of the support spokes then lie on an enveloping curve which surrounds the trunk with the required play. The number of the support spokes and the formation of the padding is such that the necessary support is afforded. The planting of the tree stakes about the young tree naturally cannot be carried out with a great dimensional accuracy, so that very often eccentric positions of the tree trunk result relative to the tree stand. An adaptation to eccentric positions of this kind is possible via a corresponding adjustment of the support spokes.

An adaptation to the tree's growth takes place in a very simple manner by a subsequent positioning of the support spokes. It is merely required to move the ends of the support spokes farther away from the tree. As the trunk holding ring can thereby retain a constant circumference, the firm union between the trunk holding ring and the tree stakes is not influenced. Reactive forced do not occur in connection with the subsequent positioning of the support spokes, and also no harmful forces are transmitted to the tree stakes. This simple subsequent adjustment of the support spokes can be carried out by trained auxiliary personnel since the operations arising herein require no experience and no craft skill. There are merely quite simple manipulations required.

The adjustment of the distance of the support spoke ends from the tree trunk can take place in that these support spokes are moved axially relative to the trunk holding ring. This axial movement then takes place in the plane of the ring.

It lies within the scope of the invention to develop the support spokes so that they are pivotably positioned at the trunk holding ring. By means of a pivoting of the support spokes at the trunk holding ring, the ends of the support spokes are then moved towards the tree trunk or away from it.

For certain purposes of application, it can be advantageous that the ring has the shape of a polygon. The ring, moreover, can have, for example, the shape of a triangle or quite generally the shape of a polygon and can, for example, be formed as a quadrilateral or hexagon or the like. This shaping of the ring depends on the specific purpose of use.

A particularly simple embodiment results if the ring is a circular ring. A circular ring is particularly advantageous on account of the simple construction and assembly.

The trunk holding ring is sub-divided into ring sections which are pivotably connected one to another by means of joints. The ring can be transported, ready assembled, to the installation site and there placed about the tree in the manner of a ligament and then by means of a closure locked in an annular shape. This leads to a particularly easy and simple assembly. A two-part ring constitutes a very advantageous embodiment, moreover.

The axial movement of the support spokes in the plane of the trunk holding ring can take place by means of a longitudinally adjustable screwing arrangement. The screwing arrangement can be of such a type that the support spokes are passed through apertures of any desired polygonal cross-section, adjusted to the predetermined length and then tightened, by means of locknuts, at the trunk holding ring. When this is done, these support spokes possess threaded sections. It is however also possible to provide threaded holes for this purpose at the trunk holding ring, and then by a screwing in or out to adjust the lengths of the support spokes, and to fix the set lengths by locknuts.

The axially movable support spokes can however also be adjustable at the tree holding ring in around the circumference thereof and be fixable in the set position. For example, slots extending around the circumference of; the trunk holding ring can be provided for this.

The arrangement of the circumferential slots, or the arrangement of the holes or apertures, is determined by the type of use. There can be provided, for example, as many openings or holes as desired, so that the user has the liberty to apply these support spokes at the assembly at any desired necessary positions.

This longitudinal adjustment, through a screwing arrangement, can be carried out with a few manipulations by inexperienced personnel. It is moreover of particular significance that in any case the geometrical dimensions of the trunk holding ring remain constant, once and for all.

The support spokes can however also be levers, pivotable perpendicular to the plane of the ring, or into this plane, which levers stand in engagement with an adjusting ring rotatably placed at the trunk holding ring. A formation of this type brings with it the advantage that for the adjustment of all support spokes only the adjusting ring has to be actuated. This actuating of the adjusting ring can take place at a single position, so that by a single actuating procedure all support spokes are adjusted. A formation of this type is possible only with circular trunk holding rings. In the case of two part trunk holding rings, it is merely necessary to develop the adjusting rings in such a way that they have the same circumference as the halves of the trunk holding ring. In connection with a closed trunk holding ring, they then lie with their ends flush against one another. If one adjusting ring section is then actuated, the other adjusting ring section is necessarily taken with it. The guiding of the adjusting ring at the trunk holding ring can be quite simple. A simple guide groove or a guide shoulder can be provided for this purpose on the inner section of the trunk holding ring since in the case of a closed trunk holding ring, a falling out of the adjusting ring is then no longer possible.

The support spokes can bear at their ends buffers of a material flexible when cold. These buffers are exchangeably mounted at the ends of the support spokes, in order, if the occasion arises, to enable buffers worn in the course of time by the influences of weather to be exchanged. The pads can however also be arcuate padding elements which carry a reinforcement and partly surround the tree trunk. In this connection, several support spokes can engage into one arcuate padding of this type. Edge sections of the support spokes can likewise possess a padding of material flexible when cold.

At the trunk holding ring, the tree stakes can be directly mounted, for example hinged, and then are fixed at the ground in a per se known manner. It is however also possible to fasten this trunk holding ring to implanted tree stakes by means of stake holders which extend from the tree holding ring outwards. For extending the adjustment possibilities of this trunk holding ring, these stake holders, according to a further invention, are then capable of being fixed at the trunk holding ring, in detachable fashion, in a desired longitudinal setting. Additionally, as in the case of the support spokes, longitudinally adjustable screw connections can be employed with the trunk holding ring.

Since the tree stakes do not stand exactly parallel to the tree trunk, the stake holders can in an advantageous manner possess lockable hinges for the adjustment of the tilt of a stake fork. The stake fork can then be tilted into the correct position for the ideal adaptation to the tree stake, and can be connected to the tree stake by nailing or tying.

It is possible to install the stake holders so as to be adjustable in peripheral direction, exactly like the support stakes. At the same time, with particular advantage, the profile of the trunk holding ring can be so formed that this profile receives retaining elements for the stake holders. By means of these retaining elements, the stake holders can be displaced in peripheral direction and then tightened at the trunk holding ring.

A particularly preferred embodiment is a two part, circular trunk holding ring on which six axially adjustable support spokes are provided. These support spokes are preferably arranged at the equal angular distance apart of 60°. Three support spokes lie in each ring section. Three outward-extending stake holders are further provided, with this embodiment. These stake holders preferably have equal angular distances apart of 120° in peripheral direction.

If the support spokes are pivotable, perpendicular to the plane of the ring, they can be formed as two-armed levers. In particular, then, the support spokes are angle levers which are rotatably mounted on the trunk holding ring in the region of the point of intersection of the two lever arms. One lever arm, which is shorter, extends downwards roughly parallel to the inner edge of the ring. The other lever arm extends in radial direction towards the axis of the ring. The downward-extending lever arm engages in guides of the adjusting ring. If the adjusting ring is twisted, this lever arm is entrained by the adjusting ring, and the other lever arm, which extends towards the tree, takes part in the movement. The lever arm's end can continue this movement towards the centre of the ring and away from it.

For the enlargement of the adjusting stroke, the two lever arms of the support spokes enclose an obtuse angle. Moreover the lever arm pointing to the centre of the ring encloses an angle of 45° with the plane of the ring. This lever arm can extend upwards or downwards relative to the plane of the ring.

The support spokes pivotable perpendicular to the plane of the ring can also be trailing levers, one end of which is rotatably mounted at the trunk holding ring. These levers extend through guide grooves which are formed in the adjusting ring. By an appropriate twisting of the adjusting ring, the levers are so conducted in the guide grooves that they are raised or lowered relative to the plane of the ring. The adjusting ring is formed by a cylinder surface running concentric to the trunk holding ring, in which surface guide grooves running obliquely to the casing lines are arranged.

A simple construction results if the trunk holding ring possesses a circular cross-section. On this circular cross-section, support rings capable of being tightened can be arranged. These support rings can, for example, be capable of being tightened according to the manner of a clamp. They can also carry stretching screws which can be tightened against the trunk holding ring. To these support rings, support spokes are then fastened. These support spokes can be pivoted relative to the plane of the trunk holding ring and adjusted in this pivoted position. Moreover they can be brought around the circumference of the trunk holding ring into the desired position and be tightened in this position.

The support spokes can also be developed as straight levers which, with one end hinged at the trunk holding ring, are pivotable in the plane of the ring. Out of this approximately radial position, these support spokes can be moved within the plane of the ring in two directions. When this is done, the circumference of the enveloping curve determined by the ends of the support spokes is enlarged. These support spokes can carry guide pins which engage in guide grooves of an adjusting ring, so that the pivoting can be carried out again from a single position.

In a further, preferred embodiment, the support spokes, pivotable perpendicular to the plane of the ring, are arcuate levers. These arcuate levers are held at the trunk holding ring in the manner that they cannot move in peripheral direction but can pivot however in the mounting. These levers are arcuate levers and have an aperture with polygonal cross-section at the supported end. Through this cross-section extends an adjusting ring which possesses spirals. If, for example, the aperture at the lever has a square cross-section, an adjusting ring can thus extend through this opening which ring is produced from a twisted square. If a twisted square, which has spiralled edges, is moved through the square aperture, a tortional force is exerted on the lever in known manner. The arcuate edge of the lever carries a padding which forms the surface which surrounds the tree trunk, with play.

Through the principle of the rigid trunk holding ring with unchangeable dimensions and of the support spokes, adjustable relative to the ring centre, it is possible, with a simple set of structural elements, in a very simple manner, to solve all problems appearing in connection with the retaining and supporting of young trees.

The trunk holding ring can possess a U shaped profile cross-section, in such a manner that a channel is formed running externally around about the trunk holding ring. The legs of the U profile extend radially outwards. This channel forms a very good protection for the thread ends otherwise projecting from the trunk holding ring.

A connecting piece can with particular advantage be insertable into this channel of the U profile, between the trunk holding ring and a tree stake. One leg of this U profile, preferably the lower one, can possess a number of snap-in apertures into which a self-snapping pin inserted into the connecting piece is capable of being engaged.

This connecting piece can however also possess a forked end. With this, one fork section within the channel of the U profile can bear against the inner side of one leg and engage by means of a pin into a hole in the leg. The other fork section then surrounds the trunk holding ring from outside and rests on the outside of the other or opposite leg. For the support, a pressure screw is provided on this fork section, which is then capable of being tightened against the leg. For the insertion and removal, in the case of this embodiment, a movement extending in axial direction and a radial movement of the connecting piece must be carried out. In a modified embodiment, the pin at the fork section of the connecting piece resting in the channel engages in an elongated hole, and the other leg of the U profile engages in a groove in the forked end of the connecting piece. Also here a locking effect is again achieved since after loosening of the pressure screw a purely radial movement is first carried out during which the pin slides in the elongated hole, and the other leg section can come out of the groove. Only after that can a movement in axial direction enable a releasing of the connecting piece.

A further advantageous embodiment of the trunk holding ring possesses a J shaped profile which likewise forms a peripheral channel open to the outside. The lower arcuate leg of this J profile possesses a beaded edge, and the connecting piece has a forked claw end which can be suspended into this annular profile by means of a pivoting movement.

BRIEF DESCRIPTION OF THE DRAWINGS

Illustrative embodiments of the invention shall be explained in the following description with reference to the figures of the drawings. They show:

FIG. 12 a sectional view of an actuating device for the adjusting ring,

FIGS. 13–17 further embodiments of support spokes which are pivotable perpendicular to the plane of the ring, FIG. 18 a diagrammatic plan view of a support spoke which is pivotable in the plane of the adjusting ring, FIG. 19 a sectional view of one ring cross-section form of the trunk holding ring, and FIGS. 20–23 further sectional views of cross section forms with insertable connecting pieces between the trunk holding ring and a tree stake.

DESCRIPTION OF THE PREFERRED EMBODIMENTS

Figure 1:
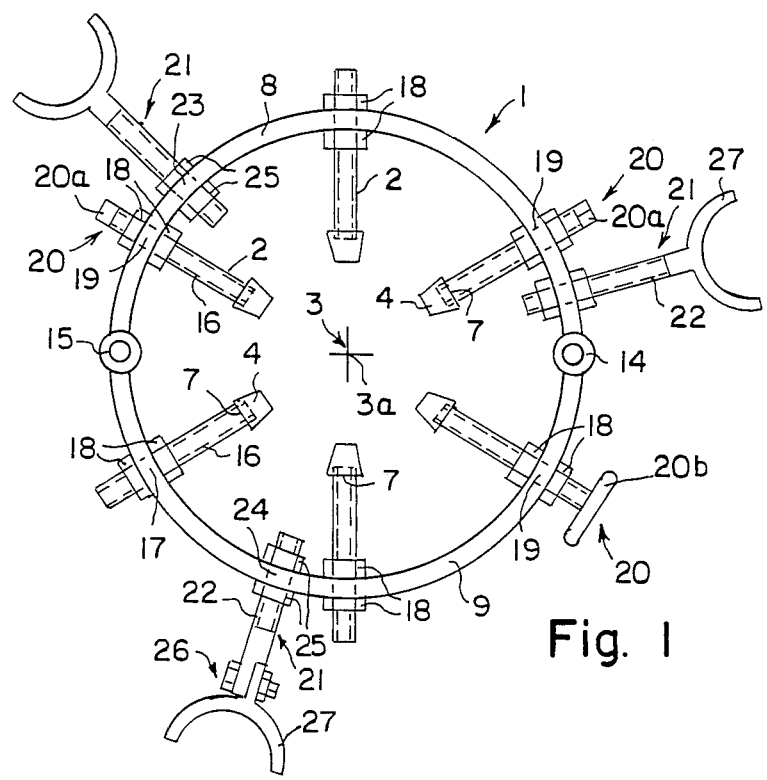
FIGS. 1-3 diagrammatic plan views of embodiments of the trunk holding ring.

The trunk holding ring shown in FIG. 1 is constructed in circular form, and consists of two ring sections 8, 9. These ring sections 8, 9 are pivotably connected by means of a joint 14. These ring sections can be pivoted around about this joint into an opening position. In the closed position they can be locked by means of a closure 15. In connection with this closure 15, it can be seen that any locking arrangement may be used including bolting ring section 8 to ring section 9. The joint 14 can be a pin joint or a hinge. At both positions, however, lugs can also be provided which engage into one another in known manner and can be connected by means of split pins or bolts.

In this illustrative embodiment, each ring section 8, 9 carries three support spokes 2. These support spokes 2 extend from the trunk holding ring 1 inwards towards the central region 3 of the ring. The ring axis 3a extends through this central region 3 of the ring, in the illustration perpendicular to the plane of the drawing. This central region 3 of the ring is the region through which the tree then extends. At the ends 7 of the support spokes 2 are buffers 4 made of a material flexible when cold, for example a rubber, which is flexible when cold. These buffers can be pushed on or screwed on. The fastening is of such a kind that on the one hand these buffers are securely retained but on the other hand can be easily exchanged.

The ring sections 8, 9 possess several apertures 17 or threaded holes 19 on their periphery.

The apertures 17 can have any desired polygonal cross-section, and are not provided with a thread. The cross-section, which can be triangular, quadrilateral, hexagonal or the like, is adapted to the dimensions of the support spokes. A support spoke 2 shows a threaded section 16. By means of this threaded section 16, the support spoke 2 is inserted into the aperture 17 in such a manner that it extends by a desired length towards the central region 3 of the ring. The length is adjusted in such a manner that the necessary play results between the buffer 4 and the trunk of the young tree. In this position the support spoke 2 is then fixed by means of the lock nuts 18 at the ring section 8 or 9. In case necessary or desired, packing discs can be applied.

It is also possible to screw the support spokes 2 by their threaded sections into threaded holes 19. For this screwing in, the support spokes 2 then have at their ends 20 either quadrilaterals or hexagons 20a or vanes 20b. By means of an appropriate screwing, the length of the support spoke 2 is then adjusted, and a fixing takes place again via lock nuts 18.

The ring sections 8, 9 have further apertures 23 or threaded holes 24. The apertures 23 have no thread and can have any desired polygonal cross-section. These apertures 23 and the threaded holes 24 serve to receive the threaded sections of the stake holders 21, which extend outwards from the trunk holding ring 1. The length by which they extend outwards can be adjusted in the same manner as in the case of the axially extending support spokes 2, and be fixed by means of lock nuts 25.

The stake holders 21 carry stake forks 27 at their ends and by these stake forks the tree holding ring 1 is then fastened to tree stakes, not illustrated.

During the assembly, the support spokes can be arranged in a retracted position at the ring sections 8, 9. The trunk holding ring 1 is placed around the tree in a pivoted open state, and is then closed. The stake holders 21 are adjusted in corresponding fashion and the stake forks 27 are connected to the tree stakes, not shown. By a corresponding screwing, the support spokes 2 can now be so adjusted that buffers 7 thereof are arranged about the tree trunk with a pre-determined play.

If a subsequent adjustment is required for the adaptation to the growth of the tree, it is merely necessary to displace the support spokes 2 axially, in appropriate manner. The lock nuts 18 are loosened, and there takes place either a shunting or a screwing away of the support spokes 2 into the appropriate end position. Then the lock nuts 18 are again tightened. This work is very simple and can be carried out by unskilled personnel.

Depending on the conditions, instead of six support spokes 2, merely three or more are also used. The number of stake holders can also be selected to match.

Figure 2:
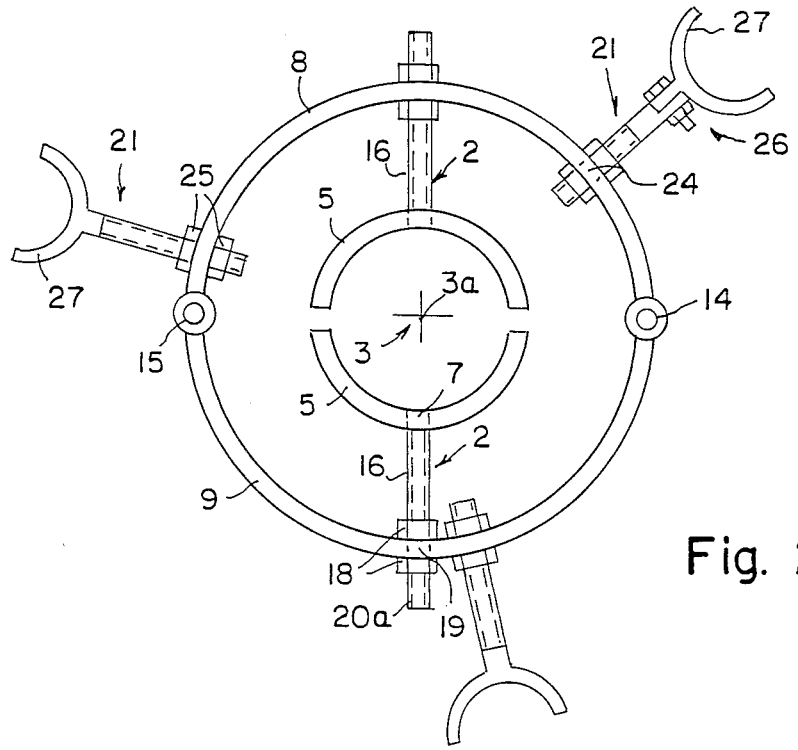

In the illustrative embodiment shown in FIG. 2, two support spokes 2 are provided, which carry specially formed paddings, namely arcuate padding elements 5. These arcuate padding elements consist of a material flexible when cold, and have a stiffening reinforcement. These arcuate padding elements partly surround the periphery of the tree. The compass of these reinforcement elements can also be smaller, and further support spokes with buffers 4 can be provided. It is possible to provide combinations of the embodiments of the padding shown in the FIGS. 1 and 2.

Figure 3:
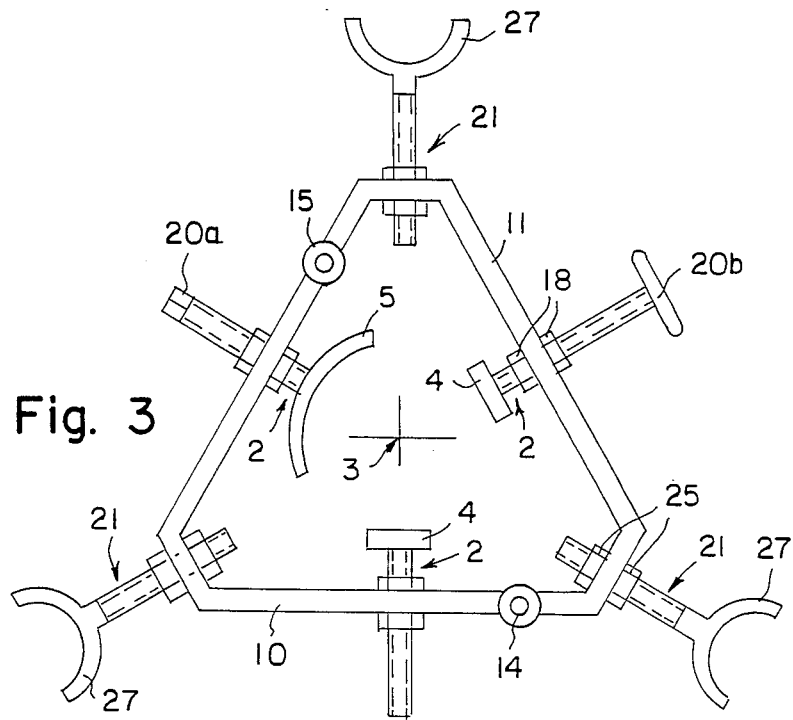

FIG. 3 shows a trunk holding ring, the ring sections 10, 11 of which yield the shape of a triangle. A trunk holding ring of this sort can, for example, be used for small trees, with three tree stakes. Instead of a triangle, other polygonal shapes can also be applied. In FIG. 3, moreover, a combination of various padding elements is shown, and indeed at the support spokes 2 buffers 4 as well as an arcuate padding element 5 are provided. The arcuate padding element 5 can also consist of two parts, which are pivotably and lockably articulated to the support spokes 2.

Figure 4:
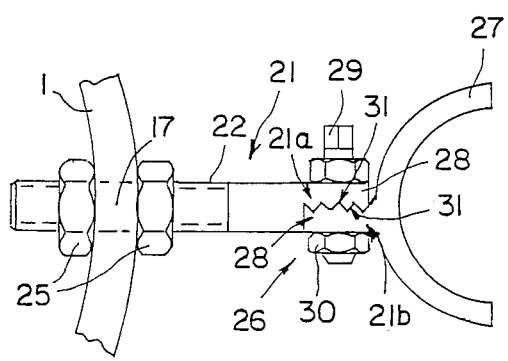
FIG. 4 an enlarged view of a stake holder.

FIG. 4 shows an embodiment of a stake holder 21, in which the position of tilt of the stake fork 27 is adjustable. The stake holder 21 possesses two sections 21a, 21b. These two sections 21a, 21b are pivotably connected to one another by means of the pivot pin 29. In the region of the pivot pin 29, these sections 21a, 21b possess discs 28 which have a teeth 31 on the inside. The stake fork 27 can be pivoted about the pin 29. In the set pivot position, the lock nuts 30 are then tightened and thereby the teeth 31 engage one with another so that the set position of tilt of the stake fork 27 is thus locked.

Figure 5:
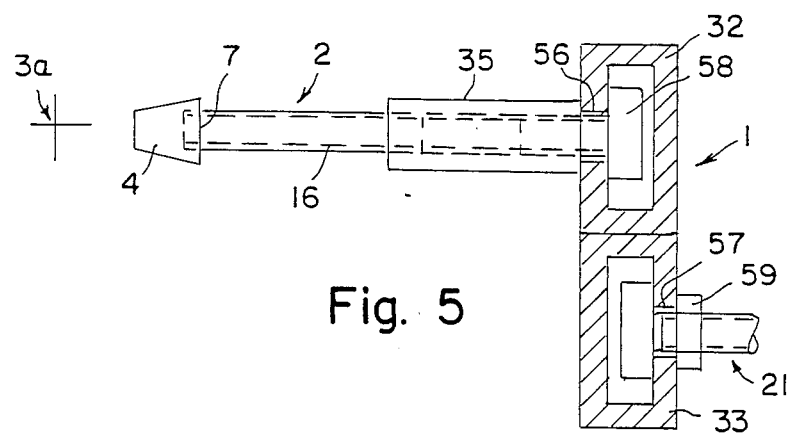
FIG. 5 a diagrammatic sectional view of an embodiment of the trunk holding ring, of the support spoke and of the stake holder, FIG. 6 a sectional view of the trunk holding ring with another embodiment of an axially displaceable support spoke, FIG. 7 a lateral view of the trunk holding ring represented in FIG. 6, FIG. 8 a diagrammatic sectional view of a fastening for the stake holder, FIG. 9 a diagrammatic sectional representation of a support spoke adjustable perpendicular to the plane of the ring, FIGS. 10+11 plan view of embodiments of the adjusting ring shown in FIG. 9.

In FIG. 5 an illustrative embodiment is represented, in which the stake holder 21 as well as the support spoke 2 are adjustable and lockable in peripheral direction.

The trunk holding ring 1 consists of two flanged U profiles 32, 33. These flanged U profiles possess slots 56, 57. The U profiles 32, 33 can be welded together in the position shown. The slots 56 of the upper U profile 32 are open inwards, and the slots 57 of the lower U profile are open outwards. Through the slots 56 extend retaining screws 58 on to which threaded sleeves 35 are screwed on. By means of the threaded sleeves 35 and the screws 58, the structural group shown in the upper section of the FIG. 5 can be displaced in the slot 56 and locked in a predetermined position.

The threaded section 16 of a support spoke 2 is screwed into the threaded sleeve 35. By a screwing inwards or outwards of the support spoke 2 in this threaded sleeve 35, the end 7 of the support spoke 2 with the buffer 4 can be moved in desired manner relative to the axis 3a of the ring. There is possible a double adjustment of the support spoke 2, namely one adjustment of the angular position at the trunk holding ring 1, and one adjustment of the length by which this support spoke 2 extends inwards.

The stake holder 21 extends outwards through the slot 57. The set peripheral position of the stake holder 21 at the trunk holding ring 1 is adjustable by means of a lock nut 59. For the adjustment of the length, a threaded sleeve like the threaded sleeve 35 can likewise be provided with this illustrative embodiment.

Figure 6:
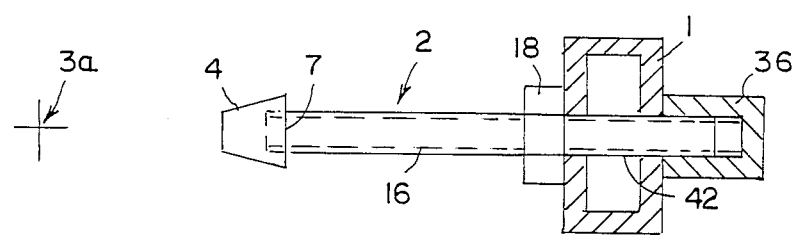
Figure 7:
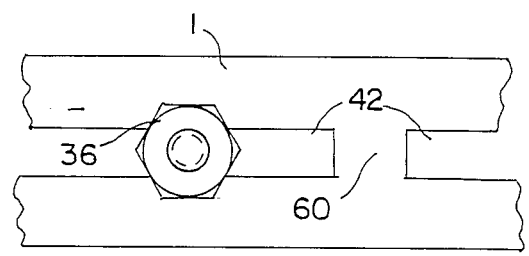

In the illustrative embodiment shown in FIGS. 6 and 7, the trunk holding ring 1 possesses slots 42 extending in peripheral direction, between which straps 60 are left. The support spoke 2 is adjusted in peripheral direction in this peripheral slot 42 and is then fixed by means of the lock nut 18 and the screw cap 36. For the adjustment of the length, a loosening of the lock nut 18 and of the screw cap 36 is required. For this again, however, merely simple manipulations are necessary.

FIG. 8 shows a further illustrative embodiment for the fixing of a stake holder 21 to the trunk holding ring 1. The attachment is of such a kind that an adjustment in peripheral directions is rendered possible. A clamp 61 is provided which surrounds the trunk holding ring 1, and by means of the clamping screw 62 can be loosened and tightened. By means of this clamp, the stake holder 21, not shown, adjacent thereto can be adjusted around the periphery of the trunk holding ring 1 and then fixed in the set position.

The FIG. 9 shows an illustrative embodiment of a support spoke 12 which is pivotably mounted at 63 on the trunk holding ring. The arrangement is of such a kind that the support spoke 12 can be pivoted in a plane perpendicular to the plane of the ring. If, for example, in the representation in FIG. 9, the support spoke is pivoted upwards, the buffer 4 thus is moved away from the axis 3a of the ring.

The support spoke 12 is a two-armed lever which possesses the lever arms 43, 44. These lever arms 43, 44 are arranged at an angle and in particular enclose an obtuse angle. The lever arm 43 extends approximately parallel to the wall of the trunk holding ring 1 downwards to an adjusting ring 38. In the illustrative example shown, the adjusting ring 38 is guided in a groove 64 of the trunk holding ring 1.

As FIG. 10 shows, the adjusting ring 38 possesses an obliquely extending guide groove 45, and the lever arm 43 extends through this guide groove. If now the adjusting ring 38 is twisted, the guide groove 45 thus takes the lever arm 43 along and as a result the lever arm 44 is also pivoted. In the illustrative embodiment shown in FIG. 11, the adjusting ring 38 carries two wedge sections 46, between which a guide groove 45a is formed, into which groove the end of the lever arm 43 then extends. The lever arm 44 extends, in the illustrative embodiment shown, upwards relative to the plane of the trunk holding ring 1. The angle between this plane of the ring and the lever arm 44 can preferably amount to 45.

As already stated, the adjusting ring 38 is so formed that it has the same circumference as the ring sections 8, 9. In the closed state of the trunk holding ring 1, the ends of the sections of the adjusting ring 38 therefore lie flush against one another so that the adjusting ring 38 can be turned as a whole.

An illustrative embodiment for the actuation of the adjusting ring 38 is shown in FIG. 12. The adjusting ring 38 possesses a toothed section 65. This toothed section 65 can be formed by appropriate notches or clefts in the adjusting ring 38. A pinion 66 meshes with the toothed section 65 and is rotatably mounted in the trunk holding ring 1 at 67. The pinion axis carries an actuating head 69 arranged outside the trunk holding ring 1. If a crank is placed on the actuating head 69, which can be, for example, a quadrilateral or hexagon, the adjusting ring 38 can be twisted by means of the pinion 66 in the desired direction of rotation, so that the desired adjustment can be carried out.

In the illustrative embodiment shown in FIG. 13, the lever arm 43 is forked and the fork ends enclose a guide rail 47. This guide rail 47 is placed at an oblique angle with respect to the adjusting ring 38. Upon twisting of the adjusting ring 38, the guide rail 47 takes the forked end of the lever arm 43 along with it, and as a result, the support spoke 12 is pivoted in a corresponding fashion.

FIG. 14 shows an illustrative embodiment with which the support spoke 13 is articulated by one end to the trunk holding ring 1. As shown, the support spoke 13 extends through a guide groove 48 in an adjusting ring 39 which has the shape of a cylindrical ring. A flange section 69 of this cylindrical ring is guided in the guide groove 64. The guide groove 48 runs obliquely to the casing line of the cylinder forming the adjusting ring 39, so that by a rotation of the adjusting ring 39 the support spoke 13 can be moved upwards and downwards, that is towards or away from, the axis 3a of the ring. The actuation of this adjusting ring takes place from one point and can be formed as shown in FIG. 12.

In FIG. 15 a trunk holding ring 34 is shown which has a circular cross-section. Support rings 49 are arranged on this trunk holding ring 34. These support rings 49 are capable of being moved around about the ring 44 in peripheral direction and are rotatable about the central axis of the trunk holding ring 34. The peripheral and rotational position of the support ring 49 can be locked by means of a screw 50 which is tightened against the trunk holding ring 34. The support ring 49 can instead also be formed after the manner of a bell capable of being tightened. To the support ring 49 is attached the support spoke 13, which is pivotable perpendicular to the plane of the trunk holding ring 34 and is adjustable in its angular position.

Figure 16:
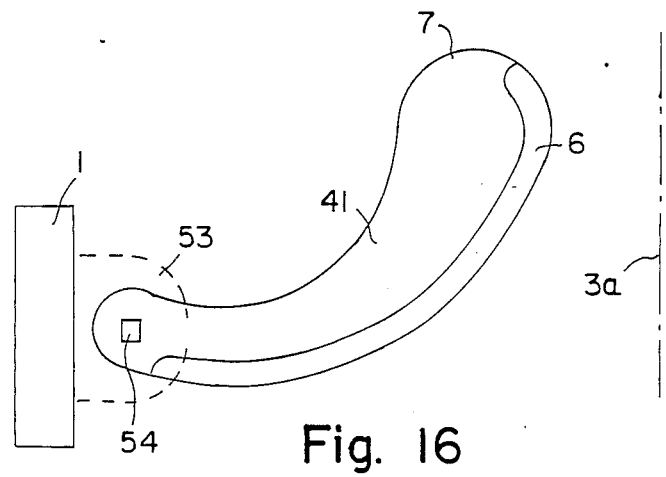
Figure 17:
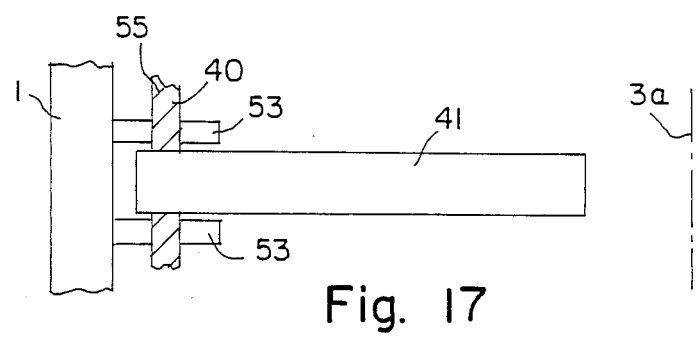

The FIGS. 16 and 17 show an illustrative embodiment in which the support spoke is a bent lever 41. This bent lever 41 possesses at one end an aperture 54 with polygonal cross-section. In the illustrative embodiment shown, this cross-section is square. Through this square aperture 54 extends an adjusting ring 40. This adjusting ring 40 possesses spirals 55. In the illustrative embodiment shown, the adjusting ring 40 can be produced from a twisted square. The lever 41 is placed on the adjusting ring 40 and is arrested by lugs 53 from a peripheral displacement relative to the trunk holding ring 1. If the adjusting ring 40 is now turned, a rotational force is transmitted to the lever 41 by the engagement of the twisted spirals 55 into the corners of the aperture 44. In this illustrative embodiment a padded edge 6 is provided. This padded edge 6 points towards the tree. Between this padded edge 6 and the tree trunk, the desired play is set in.

Figure 18:
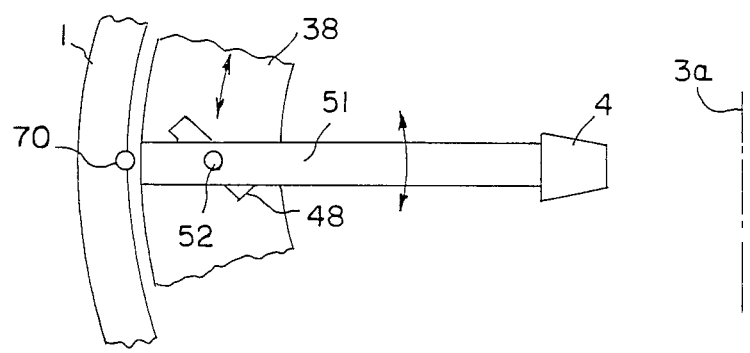

In FIG. 18 a support spoke is shown diagrammatically which is formed as a lever 51. This lever 51 is rotatably mounted on the holding ring 1, at 70. The mounting is such that the lever 51 can be pivoted in the plane of the ring in direction of the arrows shown. This lever 51 carries a guide pin 52. This guide pin 52 engages into the guide groove 48 of an adjusting ring 38, which can be so formed as was described in the above.

By a twisting of the adjusting ring 38, the buffer 4 can be pivoted in direction of the arrows indicated.

Figure 19:
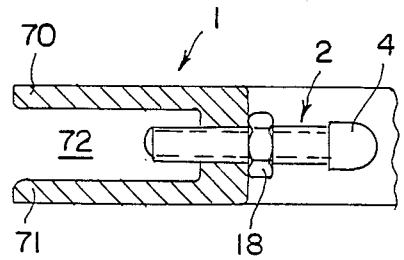

As FIG. 19 shows, the trunk holding ring 1 can have the cross-section of a U profile. The formation is such that as a result a circumferential channel 72 open outwards is formed on the trunk holding ring 1, which channel is bounded by the legs 70, 71 of the U profile. The trunk holding ring can in this case consist of plastic or injection-moulded aluminium. As the FIG. 19 gives to understand, this embodiment simultaneously protects the threaded end of the support spoke 2 otherwise projecting from the trunk holding ring.

Figure 20:
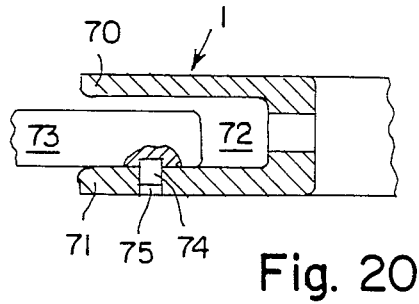
Figure 21:
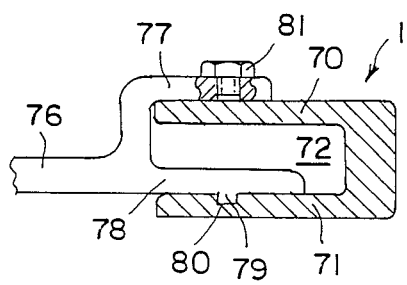
Figure 22:
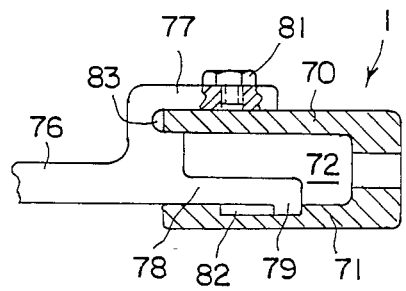

The FIGS. 20-22 show advantageous connection possibilities of a U profile of this sort with a connecting piece between the trunk holding ring and a tree stake.

By the representation in FIG. 20, one end of a connecting piece 73 is inserted into the channel 72 of the trunk holding ring 1. The lower leg 71 of the U profile possesses a hole 75. The connecting piece 63 bears an inserted self-snapping pin 74. By pushing in, this pin 74 can engage into the hole 75.

In the illustrative embodiments shown in the FIGS. 21 and 22, a further securing arrangement is incorporated which makes special manipulations necessary during insertion and removal. The connecting piece 76 shown in FIG. 21 possesses a forked end with two fork sections 77, 78. The fork section 78 extends into the channel 72 and has a pin 79 which can engage into a hole 80 in the leg 71. The other fork section 77 clasps round the trunk holding ring 1 from outside and lies against the outward side of the other leg 70 of the U profile. This fork section 77 carries a pressure screw 81. If this is tightened, a bracing takes place. For the insertion and removal, with this embodiment, one radial movement and one axial movement are necessary in each case.

In the embodiment shown in FIG. 22, three consecutive movement steps are required, namely one radial, then one axial, and then again a radial. The forked end 78 of the connecting piece 76 bears a pin 79 which engages into an elongated hole 82 in the leg 71 of the U profile. The engagement is such in this case that, at the insertion, the end of the leg 70 of the U profile of the trunk holding ring 1 must engage simultaneously into a groove 83 which is provided in the forked end. For the tightening, again a pressure screw 81 is provided. In order to be able to carry out an axial separating movement, a radial separating movement must first be carried out with this illustrative embodiment, in order that the leg 70 can emerge from the groove 83. Only after this can an axial movement be carried out which is followed by a radial separating movement. On the insertion, the movement procedure is reversed.

Figure 23:
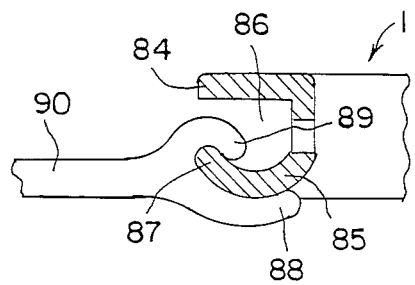

In the embodiment shown in FIG. 23, the trunk holding ring has the cross-section shape of a J, which is designated as 84. This profile again forms a circumferential channel 86, open outwards. The lower arcuate leg of this profile possesses a beaded edge 87. The connecting piece 90 possesses a claw end 89 with two claw attachments 88, 89. The claw attachement 88 is adapted to the arcuate leg 85 of the J shaped profile and the claw attachment 89 is so formed that in the inserted state it can enclasp the beaded edge 87, as depicted. With this embodiment, the insertion and removal take place through a pivoting, in the plane of the drawing, of the connecting piece, 90 in the representation.

In the embodiments shown, the compressive forces exerted by the tree stakes can be transmitted in simple fashion through the stake holders and the ring sections 8 and 9 and support spokes 2.

The trunk holding ring I brings with it further the advantage that it alone, with the tree stakes, form a framework with considerable retention of steadiness. A separate bracing of the tree stakes is no longer required, and this saves material and working time.

I claim:

1. A padded trunk-holding apparatus for a planted young tree surrounded by tree stakes, which apparatus encompasses the tree and is capable of adjustment during the growth thereof, which apparatus is connected or connectible to the upper end sections of a plurality of tree stakes, the apparatus comprising:
    a trunk-holding ring having two semi-circular sections joined by a hinge at one end thereof;
    a means for selectively locking said semi-circular hinged sections in a closed position;
    at least two padded support spokes extending from the trunk-holding ring towards a ring axis passing through the trunk-holding ring center region, the ends of the support spokes are movable towards and away from the ring axis and are capable of being set in a desired adjustment; and
    at least two adjustable stake-holding means associated with the trunk-holding ring for connecting the ring to the upper end sections of the tree stakes, said stake-holding means being adjustable towards or away from said ring axis and at least one of said adjustable stake-holding means having hinge means allowing adjustment relative to said ring axis, while said support spokes remain set in said desired adjustment.

2. Trunk holding ring according to claim 1, characterised in that the padded support spokes are movable towards and away from the ring axis relative to the trunk holding ring.

3. Trunk holding ring according to claim 1, characterised in that said ring is a circular ring.

4. Trunk holding ring according to claim 1, characterised in that the ring sections of the trunk holding ring are pivotably connected by means of joints and are capable of being bolted into annular form by means of at least one closure.

5. Trunk holding ring according to claim 1, characterised in that said ring is in two parts.

6. Trunk holding ring according to claim 1, characterised in that the padded support spokes movable towards and away from the ring axis are capable of being fixed at the trunk holding ring by means of a longitudinally adjustable screw fixture (16, 17, 18, 19, 35, 36).

7. Trunk holding ring according to claim 1, from which said at least two stake holding means extend outwards, characterised in that the stake holding means are capable of being fixed to the trunk holding ring, in detachable fashion, in a desired longitudinal setting.

8. Trunk holding ring according to claim 7, characterised in that said at least one adjustable stake-holding means having a hinge means possess lockable hinges (26) for adjusting the tilt of a stake fork (27).

9. Trunk holding ring according to claim 6, characterised in that the padded support spokes are capable of being fixed, in a manner adjustable towards and away from the ring axis, to the tree holding ring in openings (17) and/or threaded holes (19) by means of lock nuts.

10. Trunk holding ring according to claim 1, characterised in that said trunk holding ring bears six of said support spokes, preferably arranged at the same angular distance from one another, and three stake holding means, preferably arranged at the same angular distance from one another.

* * * * *

UNITED STATES PATENT AND TRADEMARK OFFICE
CERTIFICATE OF CORRECTION

PATENT NO. : 4,848,027
DATED : July 18, 1989
INVENTOR(S) : Bernhard SKIERWIDERSKI It is certified that error appears in the above-identified patent and that said Letters Patent is hereby corrected as shown below:

Cover page, column 1, item [54] line 1, after "RING" add --, IN SEVERAL PARTS, OF A TREE STAND--

Signed and Sealed this

Twenty-sixth Day of June, 1990

*Attest:*

HARRY F. MANBECK, JR.

*Attesting Officer*   *Commissioner of Patents and Trademarks*